United States Patent
McClintock et al.

(10) Patent No.: US 10,114,960 B1
(45) Date of Patent: Oct. 30, 2018

(54) IDENTIFYING SENSITIVE DATA WRITES TO DATA STORES

(71) Applicant: Amazon Technologies, Inc., Reno, NV (US)

(72) Inventors: Jon Arron McClintock, Seattle, WA (US); Tushaar Sethi, Seattle, WA (US); Maarten Van Horenbeeck, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/220,880

(22) Filed: Mar. 20, 2014

(51) Int. Cl.
| G06F 21/00 | (2013.01) |
| H04L 29/06 | (2006.01) |
| G06F 21/62 | (2013.01) |
| G06F 21/55 | (2013.01) |

(52) U.S. Cl.
CPC ............ *G06F 21/62* (2013.01); *G06F 21/554* (2013.01); *H04L 63/1408* (2013.01); *H04L 63/1433* (2013.01)

(58) Field of Classification Search
CPC .. G06F 21/62; H04L 63/1408; H04L 63/1433
See application file for complete search history.

(56) References Cited

U.S. PATENT DOCUMENTS

| 7,950,058 | B1* | 5/2011 | Rockwood | H04L 63/1416 726/23 |
| 8,056,136 | B1* | 11/2011 | Zaitsev | G06F 21/56 726/24 |
| 9,691,027 | B1* | 6/2017 | Sawant | G06N 5/025 |
| 2007/0283439 | A1* | 12/2007 | Ballard | G06F 21/562 726/24 |
| 2008/0077987 | A1* | 3/2008 | Hanes | G06F 21/562 726/22 |
| 2008/0229419 | A1* | 9/2008 | Holostov et al. | 726/24 |
| 2010/0162349 | A1* | 6/2010 | Kawai | 726/1 |
| 2013/0276114 | A1* | 10/2013 | Friedrichs | G06F 21/56 726/23 |
| 2014/0283083 | A1* | 9/2014 | Gula et al. | 726/25 |
| 2015/0047034 | A1* | 2/2015 | Burnham | H04L 63/1425 726/23 |
| 2015/0118992 | A1* | 4/2015 | Wyatt | H04W 12/08 455/410 |
| 2015/0172300 | A1* | 6/2015 | Cochenour | H04L 63/145 726/23 |
| 2015/0254158 | A1* | 9/2015 | Puri | G06F 11/3476 714/37 |

* cited by examiner

Primary Examiner — Linglan E Edwards
(74) Attorney, Agent, or Firm — Davis Wright Tremaine LLP

(57) ABSTRACT

Techniques for detecting access to computer system data by applications running on a computer system are described herein. Data access event log entries are recorded, the log entries including one or more metadata items associated with how the computer system application accessed the computer system data. The log entries are analyzed using correlations with other computer system events and, if improper access is detected, one or more operations relating to the type of data accessed and the type of violation are performed to mitigate the improper data access.

21 Claims, 9 Drawing Sheets

IDENTIFYING SENSITIVE DATA WRITES TO DATA STORES

BACKGROUND

Modern computing systems place a high importance on maintaining data security and identifying potential data security leaks. In a computing system where many users may have access to many systems, and where those systems may have access to sensitive, protected and/or interesting data, tracking where that data goes may be a difficult problem. Tracking such data also does not typically scale well and may become increasingly difficult as the size or complexity of the system increases, as the number of users increases, as the amount of sensitive, protected and/or interesting data increases or as the number of services that access that data increases. Searching all potential data storage locations on complex systems for improperly located data may be time consuming and resource intensive when the data may be placed in local storage, network storage, temporary storage or in other such storage locations. Such time consuming and resource intensive searches may lead to errors in locating improperly stored data due to the extensive search space, resulting in possible data security breaches. Such time consuming and resource intensive searches may also lead to a degraded user experience as computing system resources are diverted to the search process.

BRIEF DESCRIPTION OF THE DRAWINGS

Various embodiments in accordance with the present disclosure will be described with reference to the drawings, in which.

DETAILED DESCRIPTION

Figure 1:
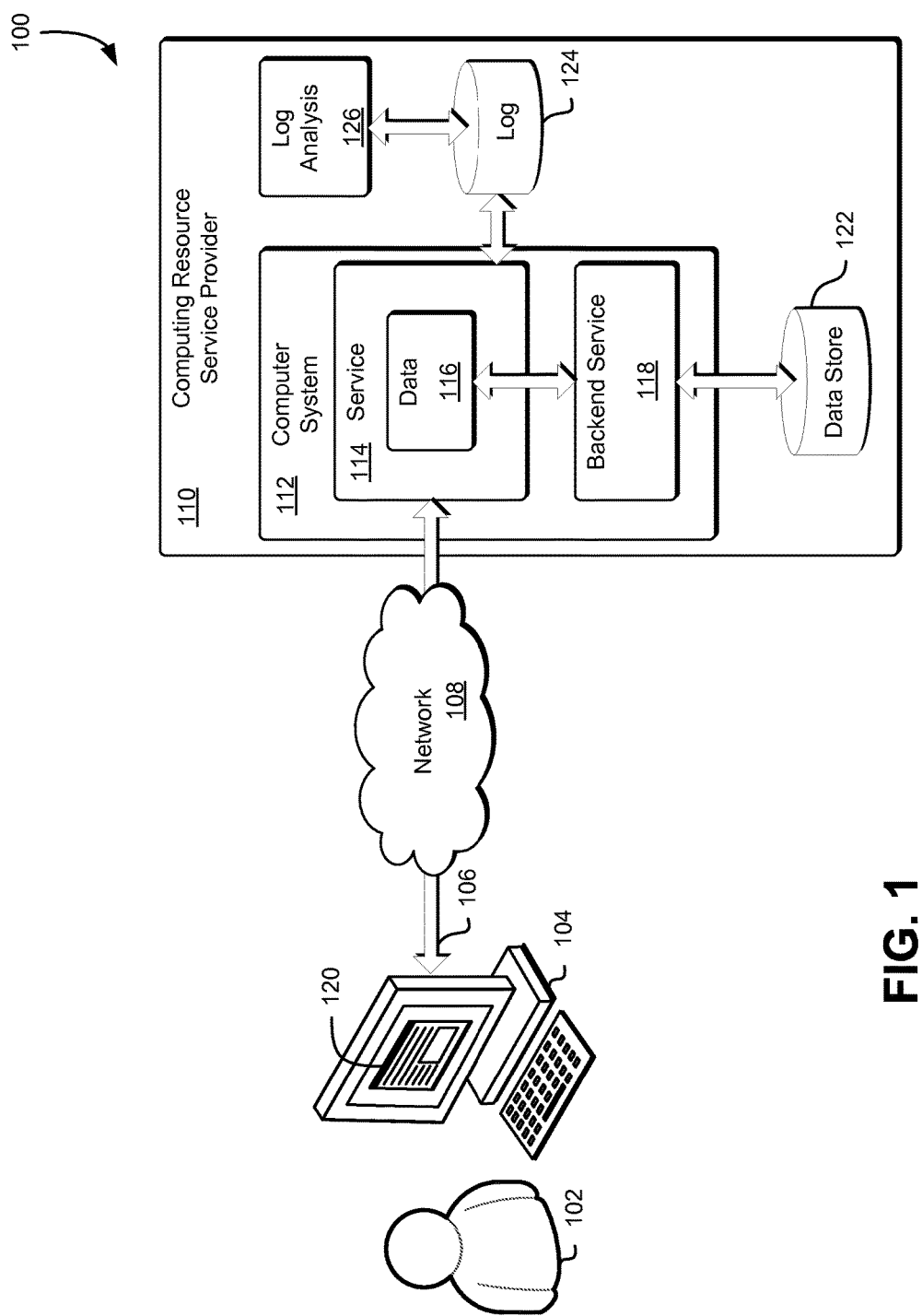
FIG. 1 illustrates an environment where sensitive data accesses may be logged in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for identifying storage of sensitive, protected and/or interesting data to computer system data stores using data analysis techniques combined with one or more software plugins such as browser plugins, library plugins, library modules, application programming interface (API) plugins and/or other such plugins. A computing system may be a distributed system with multiple hosts, or may be a single system with multiple virtual machines, or may be a networked combination of such machines or may be a combination of these and/or other such systems. A computing system may have users, modules, applications, services, processes, programs and/or other such entities. A computing system environment may have a plurality of data stores which may store a variety of sensitive, protected and/or interesting data. For example, a computing system may have sensitive customer information such as credit card numbers or personal identifying data, or a computing system may have protected security data such as user names, passwords or security keys, or a computing system may have protected customer data such as financial information or project plans or a computing system may have some other types of data which, while not related to sensitive or protected applications, an organization may wish to track. As may be contemplated, the examples of types of sensitive, protected and/or interesting data illustrated herein are merely illustrative examples and as such, other types of data may be considered as within the scope of the present disclosure.

In a computing system with a plurality of data stores which may store a variety of sensitive, protected and/or interesting data, a large number of users, modules, applications, services, processes, programs and/or other such entities may use, store, produce and/or provide such data to other users, modules, applications, services, processes, programs and/or other such entities. In a large distributed computing system environment such as, for example, an enterprise computing system environment, with a proliferation of computer system services and other such entities, it may be difficult to determine where sensitive data is being created or produced, where sensitive data is being transformed, where sensitive data is being consumed and where sensitive data is being stored. Losing track of sensitive data at any point in the process may make it difficult to determine whether any services are improperly storing sensitive data and thus, whether there may be a data security breach. For example, an enterprise system may contain sensitive data such as credit card data. A validation service may access that data properly and may be configured to prevent data writes of that sensitive data. But that validation service may be accessed by a purchasing service, which may be accessed by a web service, which may be accessed by a web browser, which may in turn be accessed by a user. The credit card data may then potentially end up in any storage location that is accessible by any of the other services, the browser or the user. Searching all such possible storage locations for improperly stored sensitive data may be difficult and/or impractical.

The techniques described and suggested herein include systems and methods for reducing the size and/or scope of the search for possible storage locations for improperly stored sensitive, protected and/or interesting data (referred to herein simply as "sensitive" data). First, a computing system may have a system or method for determining when and where sensitive data is being used. Sensitive data may be used when it is created, transformed, provided, consumed, stored and/or otherwise accessed. For example, when a computing system user enters a credit card number into a front-end service and that credit card number is to be stored within the computing system, a sensitive data record may be created on entry, transformed into an encrypted form, provided to a purchasing service, consumed by the purchasing service and stored in a permanent record associated with that user for later use. A typical computing system may track the sensitive data permanent record, and may, in some embodiments, track the access of the sensitive data by at least a part of the other services that may access the sensitive data. A typical computing system may not necessarily track all services that have access to those services and thus may have access to the sensitive data. As may be contemplated, the types of access to sensitive data as well as the types of sensitive data described herein at illustrative examples and other such types of sensitive data access and other types of sensitive data may be considered as within the scope of the present disclosure.

A computing system may be configured to first determine when and where sensitive data is being used by implementing one or more data monitoring techniques. Data monitoring techniques may be used to monitor and/or log access to sensitive data by computer system services, applications, processes, programs, modules and/or other such computing system entities. Data monitoring may be used to track the arrival of sensitive data at the destination service and/or to track what is done with that sensitive data after it arrives.

One example of a data monitoring technique is for the computing system to mandate a data monitoring software plugin for any software that wishes to access sensitive data. A software plugin is a library of software code that is designed to provide additional and/or specialized software functionality to a piece of software code. There are many examples of software plugins such as file loaders, media players dedicated to certain media types, numerical processors and/or other such plugins. Many software applications are designed and built with plugin functionality in mind, so that the software may be extended easily to provide new capabilities. As an example, many web browsers support software plugins for the purpose of handling certain data types. These plugins may be created and installed by third-party vendors. They may also be queried, enabled, disabled and/or other such similar operations. Using such operations, a data monitoring software plugin may be mandated by a computing system. When a service with sensitive data receives a request for that data, the system may first query the requestor to see if an appropriate plugin is installed and running If the plugin is not installed, the service may install the plugin on the requestor. If the plugin is not running, the service may start the plugin on the requestor. In some embodiments, if the plugin is not running, the service may deny the data access request and may instead cause a message to be displayed indicating that the request cannot be fulfilled until the service is started. In some embodiments, data monitoring may also be mandated in software without the one or more plugins by requiring the accessing software do so by using an API to make calls to the service with the sensitive data. In such embodiments, the data monitoring may be incorporated into the API functionality.

Another example of a data monitoring technique may be for a service to monitor security, permissions and/or rights associated with providing access to computing system services and/or resources. In such a data monitoring technique, a computer system service, application, process, program, module and/or other such computing system entity that wishes to access a service with sensitive data may first be required to request such access from a security, permission and/or rights management service that may be configured to authorize access by client software to the endpoint service. Monitoring and/or logging such access may enable a computing system to determine which client software may have access to sensitive data.

A third example of a data monitoring technique may be for a service to access the write logs of data stores within the computing system environment to determine whether sensitive data may have been written to those data stores. A computing system may examine the write logs to determine whether sensitive data was stored in a particular data store. Monitoring data stores for sensitive data writes may be expanded to monitor data that may at least correspond to sensitive data. For example, a record for a credit card number may include sixteen digits for the number, four more for the expiration date and three more for the verification code. A succession of data writes of twenty-three digits to a data store by a client service that has access to credit card data may be logged. However, as the data may be obfuscated, particularly if the data is being misappropriated by a malicious actor, a succession of data writes of some other number of digits which may correspond to an obfuscated and/or encrypted set of credit card records may also be logged. In some embodiments, it may be beneficial for a computing system to detect when a client service has access to such data stores in order to determine whether the logs of such data stores should be monitored.

A computing system may use a combination of these and/or other such data monitoring techniques to determine when and where sensitive data may be created, transformed, provided, consumed, stored and/or otherwise accessed within a computing system. For example, a computing system may mandate browser plugins to monitor browser access to data provided by web service back ends, may mandate API controls to monitor access to data by client software, may monitor rights management software to determine which services request access to sensitive data and may also monitor logs of data stores on the system. As may be contemplated, the different types of data monitoring techniques as well as the combinations of those techniques are merely illustrative examples and other such techniques and combinations of techniques may be considered as within the scope of the present disclosure.

A computer system configured to monitor sensitive data access and/or usage may also be configured to produce logs of events related to the access and/or usage of that data. For example, a software plugin such as a browser plugin may monitor a client for the introduction of sensitive data. When sensitive data is received at the client, the software plugin may issue an event to a service on the computer system that may be configured to receive that event and which may then log the date and time of the access, type of sensitive data, size of sensitive data, number of records and/or other such information. The service on the computer system that may be configured to receive the data access event may also be configured to log other information about the data transaction including, but not limited to, one or more identifiers of a user associated with the event, the address and/or uniform resource information (URI) of the client service, the address and/or URI of the endpoint service, permissions that were used to access the service and/or other such transactional information. As may be contemplated, the types and/or content of the data and/or metadata logging described herein are illustrative examples, and other such types and/or content of the data and/or metadata logging may be considered as within the scope of the present disclosure.

The service that may be configured to log sensitive data transactions may also be configured to access and/or otherwise utilize one or more policy and/or pattern systems to limit the scope of the data logs that are recorded. Such a system may, for example, analyze the content of a data transaction to determine whether that particular transaction should be logged. In some embodiments, all transactions may be logged, or all transactions relating to a certain service, or all transactions relating to a certain data type of a certain service and/or other such data logging scopes. A sensitive data transaction logging service may be configured to examine data requests and, based on matching one or more patterns in the request, may determine whether sensitive data is being accessed by the client. A sensitive data transaction logging service may examine received data and upon detecting data such as, for example, one or more email addresses, or one or more credit card numbers or personally identifying information for one or more customers and/or other such data, determine that sensitive data is being accessed. In such an example, the logging service may log the data as well as the types of sensitive data (the patterns) that were matched to produce the log entry. In some embodiments, some or all of the sensitive data may itself be logged in a secure, encrypted and/or otherwise protected manner to aid in locating sensitive data stores while preventing a malicious attacker from using the sensitive data log in, for example, a side-channel attack.

A computing system may then be configured to analyze the logs to determine whether any unauthorized actions may have been performed with the sensitive data, including, but not limited to storage of the sensitive data in an unauthorized location. The computing system may first examine the sensitive data transaction log to determine whether any sensitive data was accessed and then may examine the sensitive data transaction log and/or other computing system logs to determine whether other actions in correlation with the sensitive data transaction may indicate unauthorized activities. For example, a network-attached storage log may indicate that a storage device was access by a system at a certain time and a sensitive data transaction log may indicate that a number of sensitive data items were accessed by the system just after that time. In such an example, the presence of data from two different logs may be combined to indicate the possibility of an unauthorized storage of the sensitive data. In some embodiments, the computing system may mark the storage device for further analysis or may first examine other logs such as the storage device write log to determine whether a write of an appropriately sized set of data occurred at approximately the same time as the sensitive data access before marking the storage device for further analysis.

A computing system may also examine other types of logs for other related information in order to determine whether unauthorized transactions relating to sensitive data may have occurred. For example, browser logs may be examined to determine if a browser has access to system hardware such as storage devices, or network logs may be examined to determine whether data was received by a system and forwarded to another, or system logs may be examined to determine whether a user creates a file and/or copies data to a clipboard or other such log accesses may be used to determine other correlations. For example, a user may access a user interface for a system that accesses and is able to display payment transactions which may include sensitive data such as customer credit card information. This access may be recorded in a sensitive data transactions log, including the host system that was used and the user identity. The user may then copy a large set of data to the clipboard and may open a spreadsheet program and may paste from the clipboard. These actions may be recorded in a system log on the same host system. Finally, the user may save the spreadsheet to a network-attached storage device that belongs to the user. This action may be recorded in a network log associated with the same host system. In this example, multiple different logs may be accessed to complete the picture of the actions that took place.

In some embodiments, in addition to one or more policy and/or pattern matching services, a computing system may access and/or otherwise use a rules engine to examine the correlations between different events in order to determine whether unauthorized transactions relating to sensitive data may have occurred. The rules engine (also referred to herein as a "data access rules engine") may provide one or more rules (also referred to herein as "data access rules") according to one or more systems, services, modules, applications and/or other such computer system entities. For example, one or more computer system environment policy services may be used to establish one or more data access rules, the data access rules based at least in part on the policy services. Using the above example, a rule that prevents "sensitive data access, followed by copying to the clipboard, followed by copying to an application, followed by saving" may tag the user's action for further analysis. Such a rules engine may rank rules violations in terms of how severe the violation is and/or may also combine violations to aggregate severity. For example, the above described rule may be a violation that is severe enough to immediately flag the user and/or the accessing service. Other rules may be less severe, and a user and/or accessing service may only be flagged after a combination or a threshold number of less severe rules are violated. In some embodiments, a rules engine may be configured to provide a confidence level of a rule being violated so that the probability that a user may have violated a rule may be established based at least in part on, for example, the number of data and/or metadata fields in a log entry that match the rule. In such embodiments, the rules engine may be configured to evaluate rules violations using one or more factors relating to the sensitive data in combination with the level of confidence of the violation. For example, highly sensitive data may only require a low probability of violation while less sensitive data may require a higher level of confidence.

In some embodiments, the rules engine may be automatically tunable so that, for example, behaviors may be learned and may be accepted. As described herein at least in connection with FIG. 4, a rules engine may be configured to flag new behavior such as new systems, new accesses, new users and so on. Such systems may be configured to recognize new entities, initially flag them for further analysis and validate those new entities in the course of the analysis so that those new entities are not constantly flagged. Similarly, a rule may flag behavior such as, for example, a certain system repeatedly accessing sensitive data while connected to network-attached storage. If it is determined that behavior is acceptable for that system, the rule may have an exception or "white list" entry added which may prevent or limit future application of that rule to that system. In some embodiments, if certain behavior is not determined to be acceptable, a user and or a system may be added to a "black list" entry such that, for example, a rule may be created that says "any action by this user (or system) should be flagged." As may be contemplated, the types of rules and/or violations described herein, the methods used by the rules engine to aggregate and/or flag such rules and/or violations and the ways that a rules engine may adapt to changing system conditions are illustrative examples and other types of rules and/or violations, methods used by the rules engine to aggregate and/or flag such rules and/or violations and the ways that a rules engine may adapt to changing system conditions may be considered as within the scope of the present disclosure.

Upon determining a potential rules violation, the computing system may then use the information stored in the various logs to narrow the search for improperly stored data and thus, locate potential violations of sensitive data security in order to mitigate those violations. In the example described herein above, with sensitive data stored in a spreadsheet in network-attached storage, the computing system may narrow the search to certain file types (spreadsheet files) in the network-attached storage location, in the directory associated with the user and that were created at approximately the same time as the data access. Such a search may be much smaller and more efficient than searching all network stores for the sensitive data.

Upon detecting the actual sensitive data in an unauthorized location, the computing system may also be configured to perform one or more responses. Such responses may include but not be limited to deleting the data, locking the file, raising a system alarm, locking down the user's permissions, disabling access by the system, updating a data-access log and/or other such responses. Responses may be determined by the rules engine and/or by another process operating in connection with the rules engine. In some embodiments, the rules engine may be configured to respond more proactively and may respond to a user who is engaging in unauthorized activity in real time. In such embodiments, a rules engine may detect that a user with access to sensitive data has, for example, copied a large amount of data to the clipboard, or copied a large amount of data to a universal serial bus (USB) device or copied a large amount of data to some other temporary and/or removable storage location. The rules engine, rather than waiting to see if that user saves that data somewhere may instead raise an alarm, open a popup window on the user's system indicating bad behavior, delete the contents of the clipboard and/or other such responses.

FIG. 1 illustrates an example environment 100 where one or more computer systems running within a computing resource service provider environment, as well as the associated code running thereon, may be used to log access to sensitive data. A user 102 may use a connection 106 to a computer system 112 through a computer system client device 104 and may initiate a connection with and/or interaction with one or more services running within the computer system 112 which may be operating within a computing resource service provider 110. In some embodiments, the computing resource service provider 110 may provide a distributed, virtualized and/or datacenter environment within which one or more applications, processes, services, virtual machines and/or other such computer system entities may be executed. In some embodiments, the user 102 may be a person, or may be a process running on one or more remote computer systems, or may be some other computer system entity, user or process. The command or commands to connect to the computer system instance may originate from an outside computer system and/or server, or may originate from an entity, user or process on a remote network location, or may originate from an entity, user or process within the computing resource service provider, or may originate from a user of the computer system client device 104, or may originate as a result of an automatic process or may originate as a result of a combination of these and/or other such origin entities. In some embodiments, the command or commands to initiate the connection 106 to the computing resource service provider 110 may be sent to the computer system 112, without the intervention of the user 102. The command or commands to initiate the connection 106 to the computer system 112 may originate from the same origin as the command or commands to connect to the computing resource service provider 110 or may originate from another computer system and/or server, or may originate from a different entity, user or process on the same or a different remote network location, or may originate from a different entity, user or process within the computing resource service provider, or may originate from a different user of a computer system client device 104, or may originate as a result of a combination of these and/or other such same and/or different entities.

The user 102 may request connection to the computing resource service provider 110 via one or more connections 106 and, in some embodiments, via one or more networks 108 and/or entities associated therewith, such as servers connected to the network, either directly or indirectly. The computer system client device 104 that may request access to the computer system 112 may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network 108 may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

One or more services such as the service 114 running on the computer system 112 may have access to sensitive data 116. The sensitive data 116 may be provided to the service 114 by a backend service 118 which may be configured to provide the data from a data store 122. The sensitive data 116 may be provided to the user 102 via the network 108 and displayed using an interface 120 running on the computer system client device 104. The interface 120 may be an interface to an application, a browser, an interface to a service, a console and/or other such interfaces. The sensitive data 116 may be data that is predetermined by a system as data that should be protected or secured and may be stored in a predetermined and known secure location. The sensitive data 116 may also be data that becomes secure as a system operates and may be stored in discoverable locations within the computing system. The sensitive data 116 may be any data that is considered protectable, of interest or requiring enhanced levels of data security including, but not limited to, payment data, legal data, credit card data, email addresses, personally identifying information, credentials such as user names, passwords, encryption keys, payment tokens, single sign-in tokens, identifiers, meta-identifiers, project names, project code names, sales trends, inventors, usability studies, behavioral studies, data that, when combined with other data, may become sensitive data or combinations of these and/or other such data types. In some embodiments, whether data is sensitive may depend on the nature of the computer system and/or the users of the computer system. For example, a computer system may be configured for compliance with the health insurance portability and accountability act (HIPAA) which may require that all data relating to health records be secured. In some embodiments, the sensitivity of the sensitive data 116 may be related to certain systems, or certain users, or certain roles and/or related to other such computer system security and/or permission policies. In some embodiments, rules associated with the level of security of a system may be adaptive and/or behavioral. In such embodiments, a computer system may be configured to, upon observing certain behavior, alter the types of data that may be considered sensitive and/or the level of protection that sensitive data may be provided.

Access to sensitive data 116 may be logged to a sensitive data log 124 and the log may be analyzed by a log analysis service 126. As described herein above, the data in the sensitive data log 124 may include, but not be limited to, the date and time of the data access, the type of sensitive data accessed, the size of sensitive data accessed, the number of records accessed, the address and/or URI of the client service, the address and/or URI of the endpoint service, permissions that were used to access the service, what patterns in the data were matched, the number of patterns matched, what rules were used to detect the access, one or more measurements of entropy, the length of the accessed data, the length of the metadata record, document structures, the calling application and/or other such information. The metadata associated with the access and that may be included in the log entries may depend on system policies, business value, the sensitivity of the data and/or other such concerns. The log entries may be generated by the calling (or client) application or may be generated by a service associated with the calling (or client) application, or may be generated by one or more other applications, processes, services, modules and/or other such computer system entities. The log analysis service 126 may use a variety of techniques to analyze the logs including, but not limited to, base lining (comparing logs to known values), filtering, pattern matching techniques such as Markov chains, call graphs and/or other such techniques.

Figure 2:
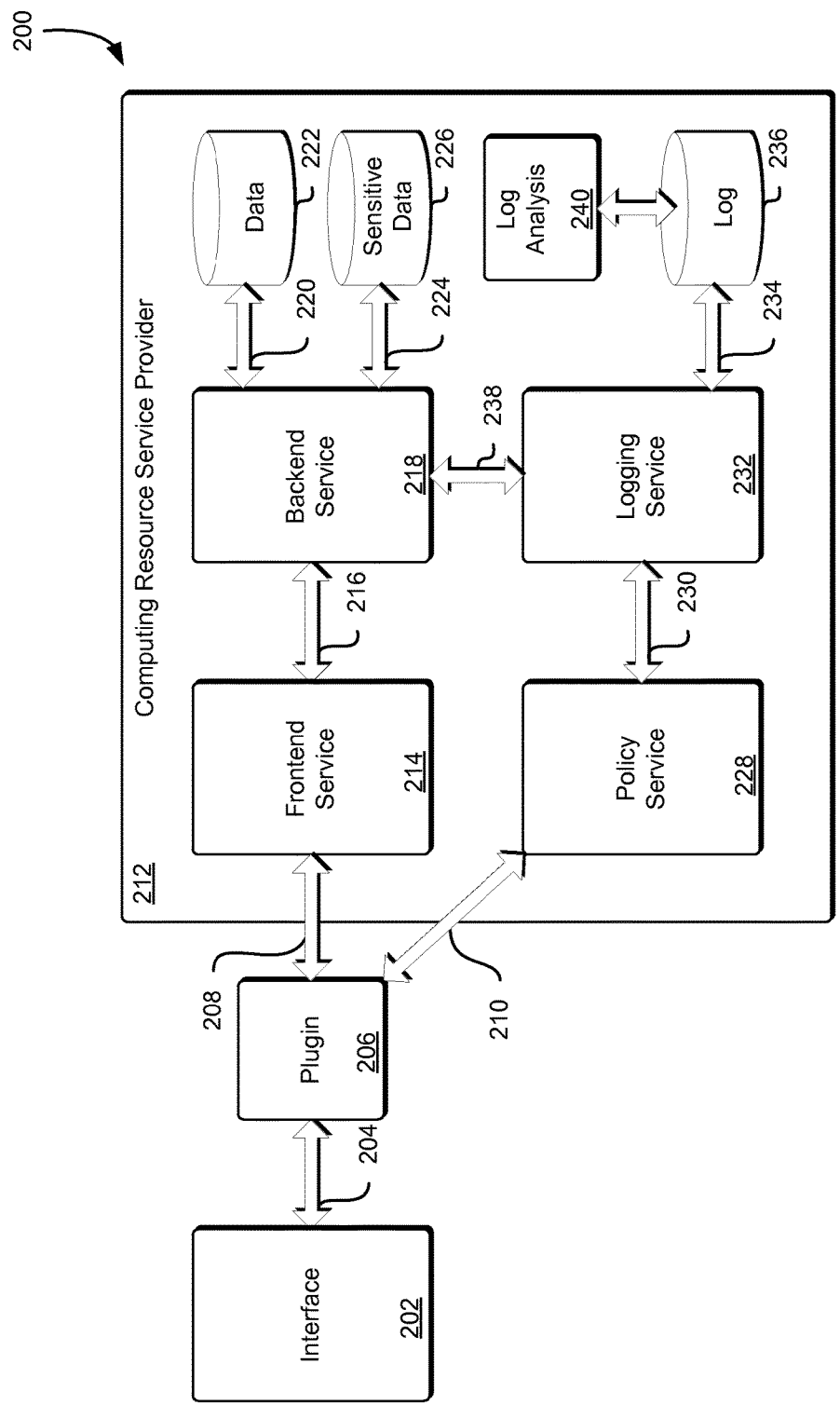
FIG. 2 illustrates an environment where an interface to a service may be instrumented to provide logging information related to sensitive data accesses in accordance with at least one embodiment.

FIG. 2 illustrates an example environment 200 where an interface may be instrumented to provide logging information related to sensitive data access as described herein at least in connection with FIG. 1 and in accordance with at least one embodiment. An interface 202 such as the interface 120 described herein at least in connection with FIG. 1 may be used to access a frontend service 214 running within a computing resource service provider 212 using a connection 204 to a plugin 206 which may be connected 208 to the frontend service 214. In some embodiments, the interface 202 may be a web browser and the frontend service 214 may be a web service. In such embodiments, the plugin 206 may be a browser plugin as described herein above. In some embodiments, the interface 202 may be an application and the frontend service 214 may be an application server. In such embodiments, the plugin 206 may be an application plugin, or may include API calls integrated with the application or may include a combination of these and/or other such application interfaces. The connection 204 from the interface to the plugin 204 and the connection 208 from the plugin 204 to the frontend service 214 may be a connection via a network such as the network 108 described herein at least in connection with FIG. 1, or may be some other connection such as the connection 106 described herein at least in connection with FIG. 1.

The frontend service 214 may be connected 216 to a backend service 218 which may have access 220 to data 222 and access 224 to sensitive data 226. In some embodiments, the frontend service and the backend service may be the same service. In some embodiments, the data 222 and the sensitive data 226 may be stored in the same location. When data is provided by the backend service 218 to the frontend service 214 via the plugin 206 to the interface 202, the plugin 206 may record a data event 210 and send that event to a policy service 228 running within the computing resource service provider 212. The data event 210 may include information about the data accessed which may include one or more metadata items as described herein at least in connection with FIG. 1. The policy service 228 may then determine, based at least in part on the contents of the data event 210, whether to forward 230 the data event to a logging service 232. For example, if the data event includes access to data 222, the policy service 228 may not forward 230 the data event to the logging service 232 but if the data event includes access to sensitive data 226, the policy service 228 may forward 230 the data event to the logging service 232. Data events forwarded to the logging service 232 may then be logged to a log 236 for further analysis by a log analysis service 240.

In some embodiments, a backend service 218 may also send an event 238 to the logging service 232. For example, the backend service 218 may send an event 238 any time it sends data to the frontend service 214 or the backend service 218 may send an event 238 any time it sends sensitive data 226 to the frontend service 214. In such example, the log analysis service 240 may then compare events from the backend service 218 to events from the plugin 206 and may use this comparison to verify that the plugin 206 has been installed and/or is functioning correctly. If the backend service has sent sensitive data that would typically result in an event from the plugin, but that event is not present in the log 236, the log analysis service may determine that the plugin 206 or the policy service 228 is not operating correctly and may use this determination to initiate a further analysis of the system.

Figure 3:
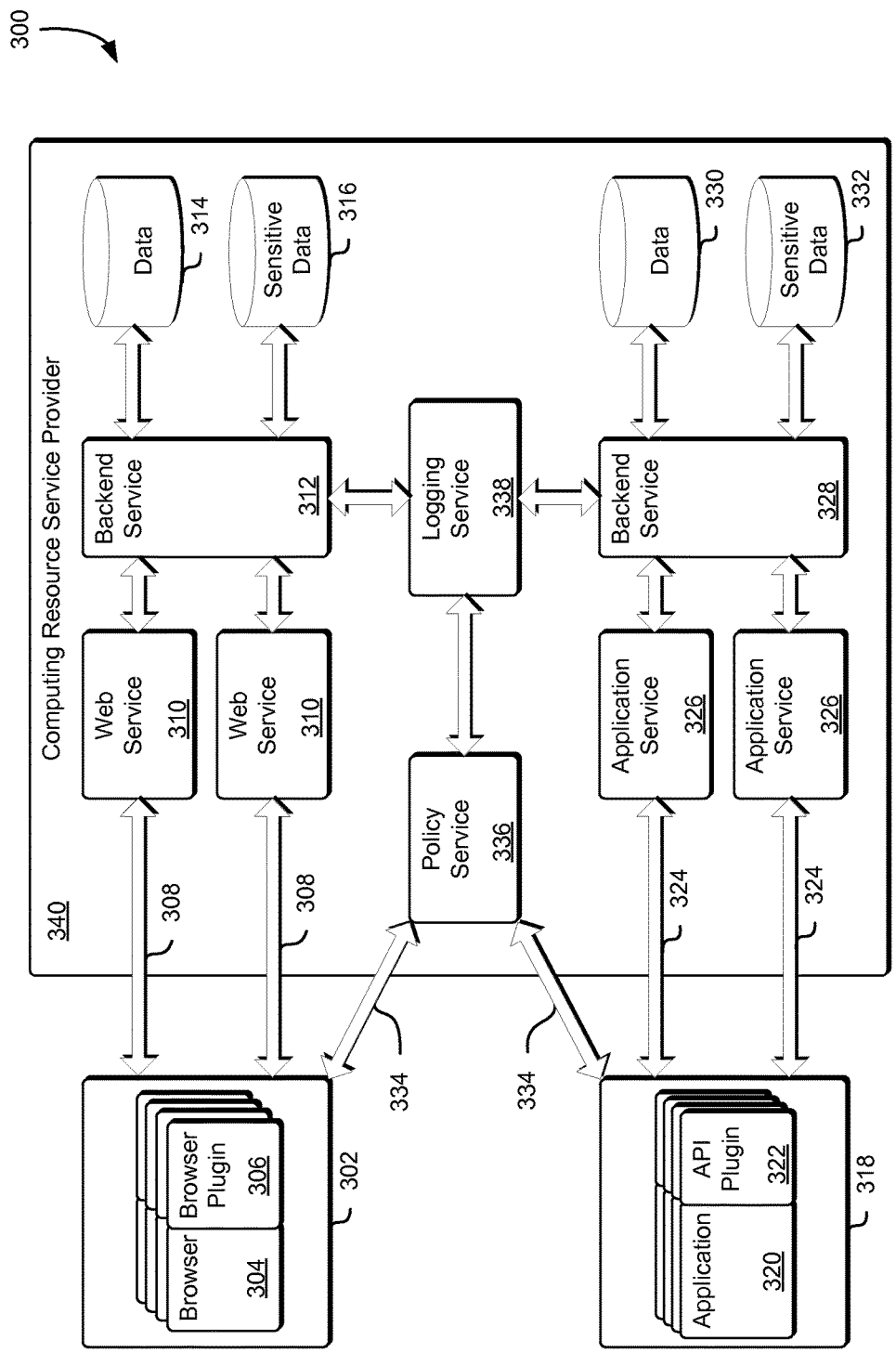
FIG. 3 illustrates an environment where one or more browsers and/or applications may be instrumented to log sensitive data accesses in accordance with at least one embodiment.

FIG. 3 illustrates an example environment 300 where one or more browsers and/or one or more applications may be configured to log sensitive data access as described herein at least in connection with FIG. 2 and in accordance with at least one embodiment. One or more 302 browsers 304 with browser plugins 306 as described herein at least in connection with FIG. 2 and in accordance with at least one embodiment may be connected 308 to a web service 310 which may be one of one or more web services running within a computing resource service provider 340. The web service 310 may be connected to a backend service 312 which may be one of one or more backend services and which may be configured to provide data 314 and/or sensitive data 316 to clients of the web service 310 such as the one or more 302 browsers 304 with browser plugins 306. One or more 318 applications 320 with one or more library plugins 322 as described herein at least in connection with FIG. 2 and in accordance with at least one embodiment may be connected 324 to an application service 326 which may be one of one or more application services running within a computing resource service provider 342. The application service 326 may be connected to a backend service 328 which may be one of one or more backend services and which may be configured to provide data 330 and/or sensitive data 332 to clients of the application service 326 such as the one or more 318 applications 320 with the one or more library plugins 322.

The one or more 302 browsers 304 with browser plugins 306 and the application service 326 such as the one or more 318 applications 320 with one or more library plugins 322 may be send data events 334 such as the data events 210 described herein in connection with FIG. 2 to a policy service 336 such as the policy service 228 described herein in connection with FIG. 2. The policy service 336 may be one of one or more policy services operating within the computing resource service provider 340. The policy service may forward the data events to a logging service 338 such as the logging service 232 described herein in connection with FIG. 2 which may include a log, a log analysis server and/or other such logging elements. The backend service 312 and the backend service 328 may also send data events to the logging service 338.

Figure 4:
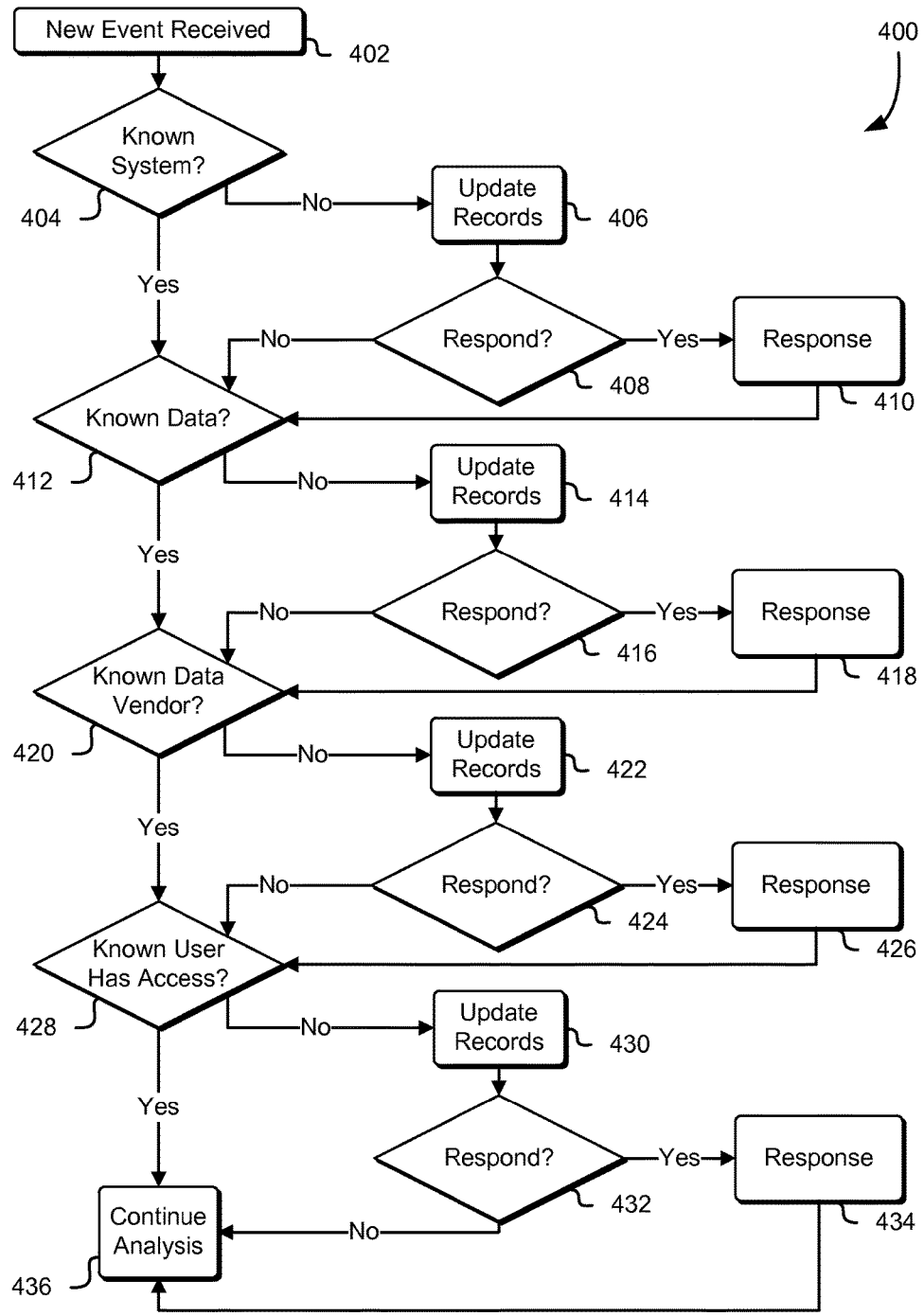
FIG. 4 illustrates a process for analyzing sensitive data access events in accordance with at least one embodiment.

FIG. 4 illustrates an example process 400 for analyzing sensitive data access events as described herein at least in connection with FIG. 2 and in accordance with at least one embodiment. A plugin such as the plugin 206 described herein at least in connection with FIG. 2 may perform some or all of the process illustrated in FIG. 4. A policy service such as the policy service 228 described herein at least in connection with FIG. 2 may perform some or all of the process illustrated in FIG. 4. A log analysis service such as the log analysis service 240 described herein at least in connection with FIG. 2 may perform some or all of the process illustrated in FIG. 4. Other entities operating within a computing system may also perform at least a portion of the process illustrated in FIG. 4 including, but not limited to, services, applications, modules, processes, operating system elements, virtual machine elements, network hardware, controlling domains (e.g., a hypervisor) or combinations of these and/or other such entities operating within the computing system.

A new sensitive data access event 402 may be received. The event may be received by analyzing entries in a sensitive data access log. Metadata associated with the event may be analyzed to determine whether the event relates to a new system, data item, data vendor, user and/or other such object having access to sensitive data. If the system is not a known system 404, a record of the system may be updated 406. If a log analysis service determines that, as a result of the metadata and/or as a result of other log events, that the system should respond 408 to the event, then an appropriate response 410 may be made. The system may determine that a response is necessary by, for example, determining whether the event, when correlated with other log events, may constitute a violation of one or more rules associated with sensitive data access. The respond to the event by, for example, issuing an alarm, or restricting permissions for the initiator of the event, or by alerting the initiator of the event or by a combination of these and/or other such responses. In some embodiments, an alarm or an alert may be sent to one or more team members of an investigation response team for further processing and/or response generation.

If the data is not known data 412, a record of the data may be updated 414. If a log analysis service determines that, as a result of the metadata and/or as a result of other log events, the system should respond 416 to the event, then an appropriate response 418 may be made. If the vendor of the data is not a known vendor of the data 420, a record of the data vendor may be updated 422. If a log analysis service determines that, as a result of the metadata and/or as a result of other log events, the system should respond 424 to the event, then an appropriate response 426 may be made. If the user (consumer) of the data is not a known user of the data 428, a record of the data user may be updated 430. If a log analysis service determines that, as a result of the metadata and/or as a result of other log events, the system should respond 432 to the event, then an appropriate response 434 may be made. In some embodiments, the log analysis server may continue analysis 436 and examine one or more additional pieces of metadata associated with the event. If those one or more pieces of metadata are not recognized by the system, they may also be logged and analyzed for appropriate responses.

Figure 5:
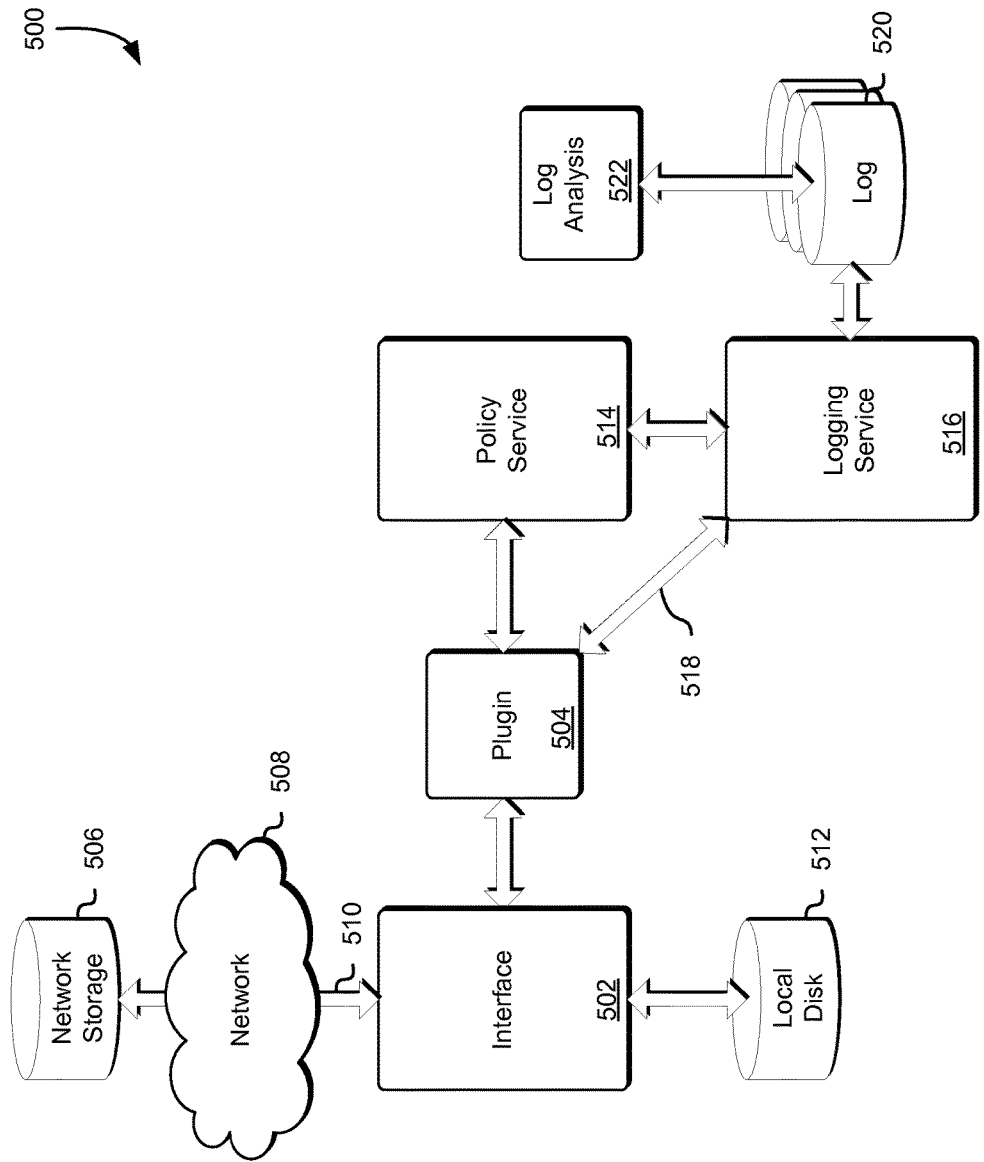
FIG. 5 illustrates an environment where additional log data related to system events may be gathered in accordance with at least one embodiment.

FIG. 5 illustrates an example environment 500 where additional logs may be produced to aid in sensitive data access analysis as described herein at least in connection with FIG. 2 and in accordance with at least one embodiment. An interface 502 may be connected to a plugin 504, which may be connected to a policy service 514 which may in turn be connected to a logging service 516 as described herein at least in connection with FIG. 2 and in accordance with at least one embodiment. The logging service 516 may be connected to and/or otherwise have access to one or more logs 520 which may be used by a log analysis service 522. The interface 502 may be running on a computer system with one or more local disks 512 and may also be connected 510 to one or more network-attached storage devices 506 via a network 508. The presence of one or more external storage devices, including removable storage devices, may be logged 518 by the plugin 504 to one or more of the logs 520. Writes to the local disk 512 and/or to the network-attached storage devices 506 may also be logged 518 by the plugin 504 to one or more logs 520. Other events related to local and/or network storage may also be logged to one or more logs 520. The additional log information may be used by the log analysis service to determine one or more correlations as described herein at least in connection with FIG. 2 and in accordance with at least one embodiment.

Figure 6:
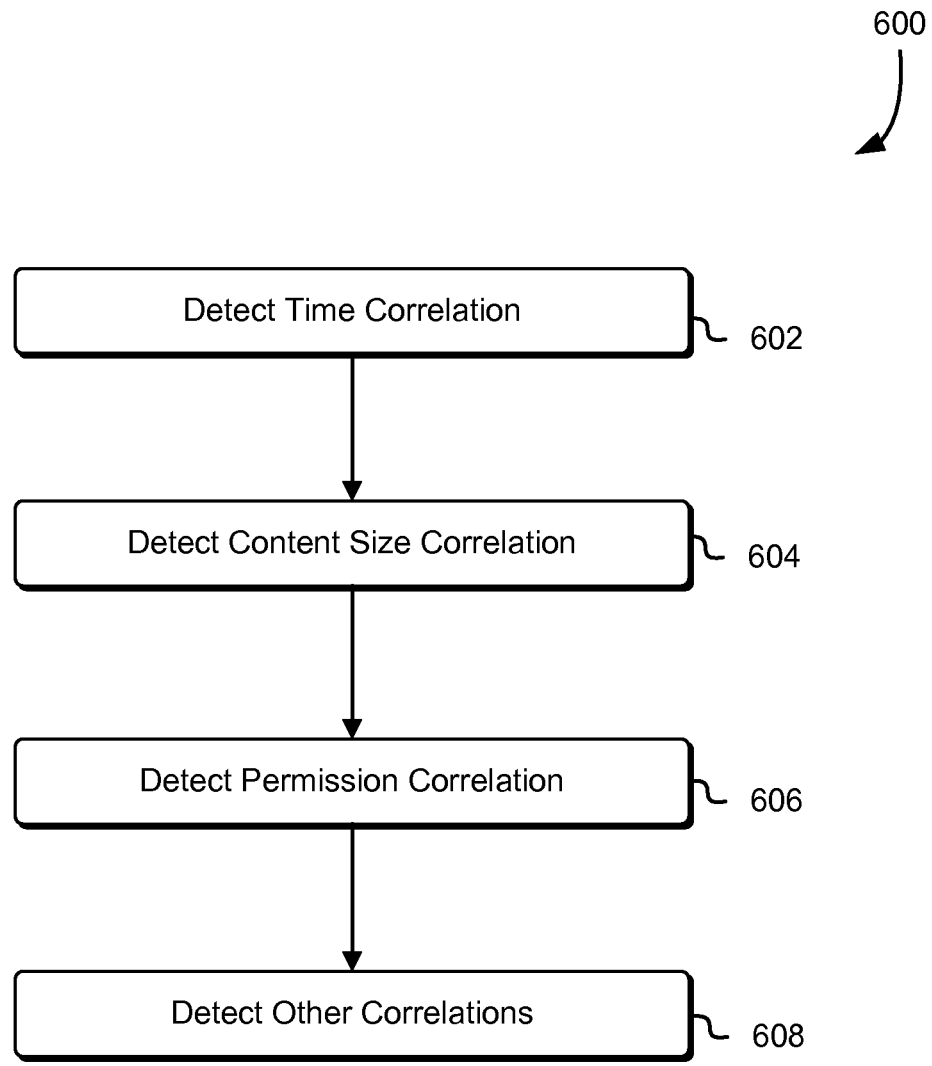
FIG. 6 illustrates a process for analyzing log correlations in accordance with at least one embodiment.

FIG. 6 illustrates an example process 600 for analyzing log correlations as described herein at least in connection with FIG. 2 and in accordance with at least one embodiment. A plugin such as the plugin 504 described herein at least in connection with FIG. 5 may perform some or all of the process illustrated in FIG. 6. A policy service such as the policy service 514 described herein at least in connection with FIG. 5 may perform some or all of the process illustrated in FIG. 6. A logging service such as the logging service 516 described herein at least in connection with FIG.

5 may perform some or all of the process illustrated in FIG. 6. A log analysis service such as the log analysis service 522 described herein at least in connection with FIG. 5 may perform some or all of the process illustrated in FIG. 6. Other entities operating within a computing system may also perform at least a portion of the process illustrated in FIG. 6 including, but not limited to, services, applications, modules, processes, operating system elements, virtual machine elements, network hardware, controlling domains (e.g., a hypervisor) or combinations of these and/or other such entities operating within the computing system.

A log analysis service may first detect if there is any time correlation 602 between sensitive data access and other system log events. For example, a disk access to external storage that may occur just prior to a data read, or just after a sensitive data read, or coincident with a sensitive data read or some other time period relative to a sensitive data read may generate a correlation between the sensitive data read and the disk access and, if there is a rule prohibiting such a correlation, the event may trigger a search for improperly stored sensitive data on the external storage device.

A log analysis service may next detect if there is any size correlation 604 between accessed sensitive data and one or more data-based events. For example, if a service performs a read of ten credit card numbers, each of which is sixteen digits and the receiving service then saves one-hundred and sixty digits to a file, or to the clipboard or to some other location, a correlation and a rules analysis for the credit card read may be generated. In some embodiments, the same size of the sensitive data may generate a correlation. In some embodiments, a file that is approximately the same size as the sensitive data may generate a possible correlation. In some embodiments, the data may be encrypted, compressed and/or otherwise obfuscated and, in such embodiments, the system may employ a number of metrics for what may determine a content size correlation.

A log analysis server may next detect if there is a permission correlation 606 between accessed sensitive data and one or more data-based events. For example, a user with certain permissions and/or credentials may access sensitive data and then that same user may access system resources that may be written to such as, for example, a network-attached storage device. The logs of the permission system associated with a system may be accessed to determine activities by a certain user while that user may have access to potentially sensitive data. A log analysis server may also detect if there is a target entity correlation 608 between the location of accessed sensitive data and the target of one or more data-based events or may detect if there is a content correlation 610 between the content of accessed sensitive data and data associated with one or more data-based events. For example, an event which copies data that is at least partially the same as sensitive data may give rise to a content correlation 610.

A log analysis server may detect other correlations 612 based on other metadata and/or other aspects of the sensitive data. For example, sensitive data may have a certain entropy characteristic which may be similar to the entropy characteristic of data stored elsewhere by the system. In another example, similar data may have similar hash values, and so correlations may be detected based on a hash value of the sensitive data. Similarly, similar data may compress in similar ways and so correlations may be detected based on compression characteristics of the sensitive data. As may be contemplated, the types of correlations described herein are illustrative examples and other types of correlations as well as combinations of these and/or other types of correlations may be considered as within the scope of the present disclosure.

Figure 7:
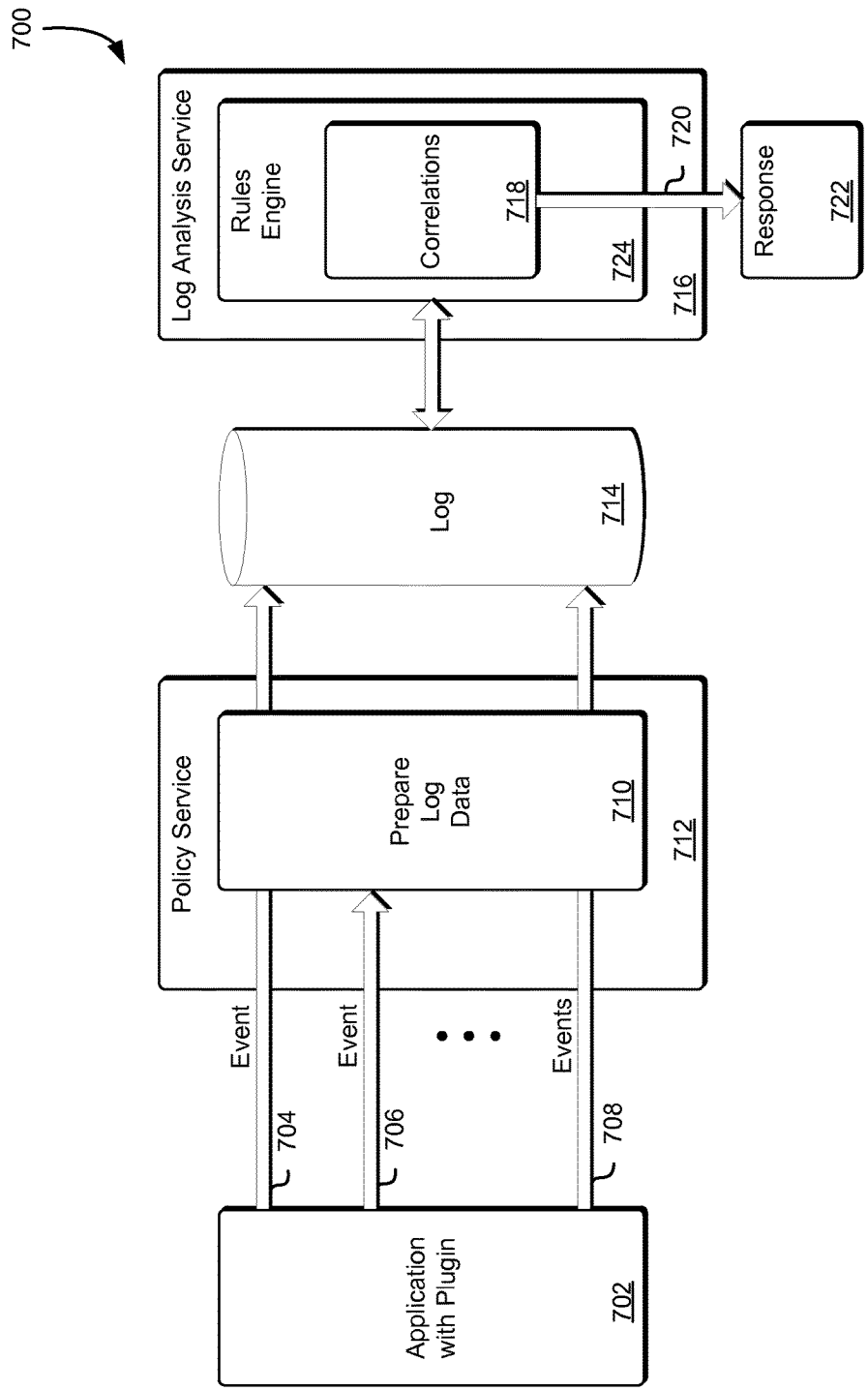
FIG. 7 illustrates an environment where sensitive data access logs may be analyzed for rules violations in accordance with at least one embodiment.

FIG. 7 illustrates an example environment 700 where logs of sensitive data accesses may be prepared and analyzed as described herein at least in connection with FIG. 2 and in accordance with at least one embodiment. An application with a plugin 702 may generate one or more sensitive data access events 708 as described herein at least in connection with FIG. 2 and in accordance with at least one embodiment. A policy service 712 may prepare the log data for the events based at least in part on the data and/or metadata associated with the event. For example, an event 704 which accesses sensitive data may be logged by the policy service 712 and sent to the log 714 while an event 706 which does not access sensitive data may not be logged by the policy service 712.

A log analysis service 716 may then use a rules engine 724 and a set of correlations 718 to determine 720 whether a response 722 to the sensitive data access is warranted as described herein at least in connection with FIGS. 1 and 2. The response 722 may include, but may not be limited to, an alarm, an email alert, an administrator ticket or a popup (either on the user system or on an administrator system). The response 722 may also include such actions as disabling one or more interfaces associated with the accessing service, disabling the service, disabling permissions for the user and/or the accessing service and/or other such responses. The log analysis service 716 may also use the rules engine 724 and the set of correlations 718 to determine 726 whether to update the state 728 of one or more aspects associated with the log analysis service 716. For example, the log analysis service may update the list of the recognized systems, the known data, the known users or the known user access rights as described herein at least in connection with FIG. 4 and in accordance with at least one embodiment.

Figure 8:
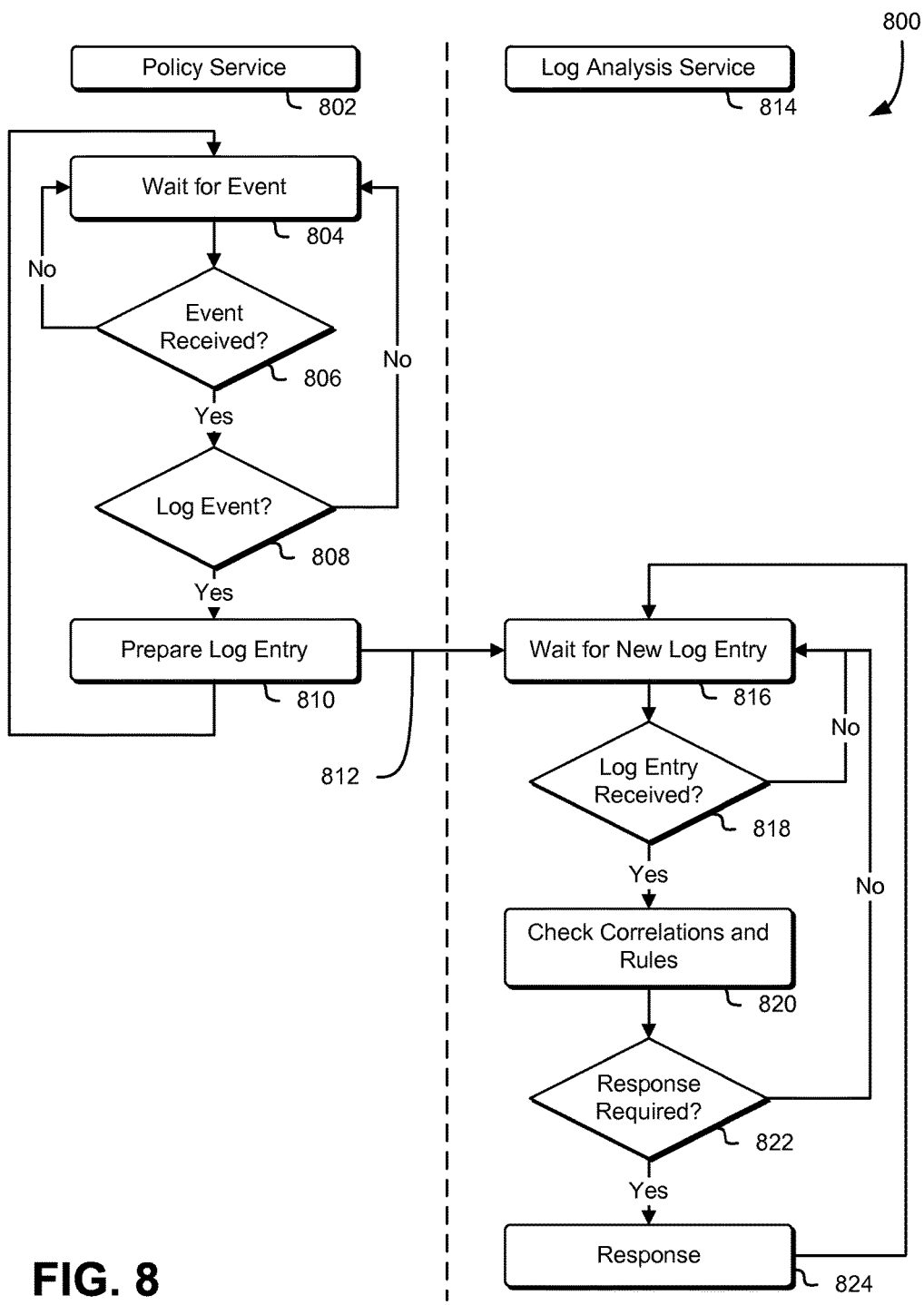
FIG. 8 illustrates a process for receiving and processing events and the log entries relating to those events in accordance with at least one embodiment.

FIG. 8 illustrates an example process 800 for receiving and processing events and for receiving and processing log entries as described herein at least in connection with FIG. 2 and in accordance with at least one embodiment. A policy service such as the policy service 712 described herein at least in connection with FIG. 7 may perform some or all of the process illustrated in FIG. 8. A log analysis service such as the log analysis service 716 described herein at least in connection with FIG. 7 may perform some or all of the process illustrated in FIG. 8. Other entities operating within a computing system may also perform at least a portion of the process illustrated in FIG. 8 including, but not limited to, services, applications, modules, processes, operating system elements, virtual machine elements, network hardware, controlling domains (e.g., a hypervisor) or combinations of these and/or other such entities operating within the computing system.

A policy service 802 may wait for events 804 and, when an event is received 806 that may relate to sensitive data access, the policy service may determine whether the event should be logged 808. If the event is logged, a log entry may be prepared 810 that may include data and/or metadata relating to the event and the log entry may then be sent 812 to the data log. The policy service 802 may then begin to wait for events 804 until the next event is received. The log analysis service 814 may monitor the log for changes, or it may periodically examine the log or it may use a combination of these and/or other log monitoring techniques. The log analysis service 814 may wait for a new log entry 816 and when a new log entry is received 818 the log analysis service 814 may check correlations and rules 820 to determine whether a state update is required 822. If a state update is required 822, the log analysis service 814 may update the state as described herein at least in connection with FIG. 7. The log analysis service may also check correlations and rules 820 to determine whether a response is required 826. If a response is required 826, the log analysis service 814 may issue the response 828 such as the response 722 described herein in connection with FIG. 7.

Figure 9:
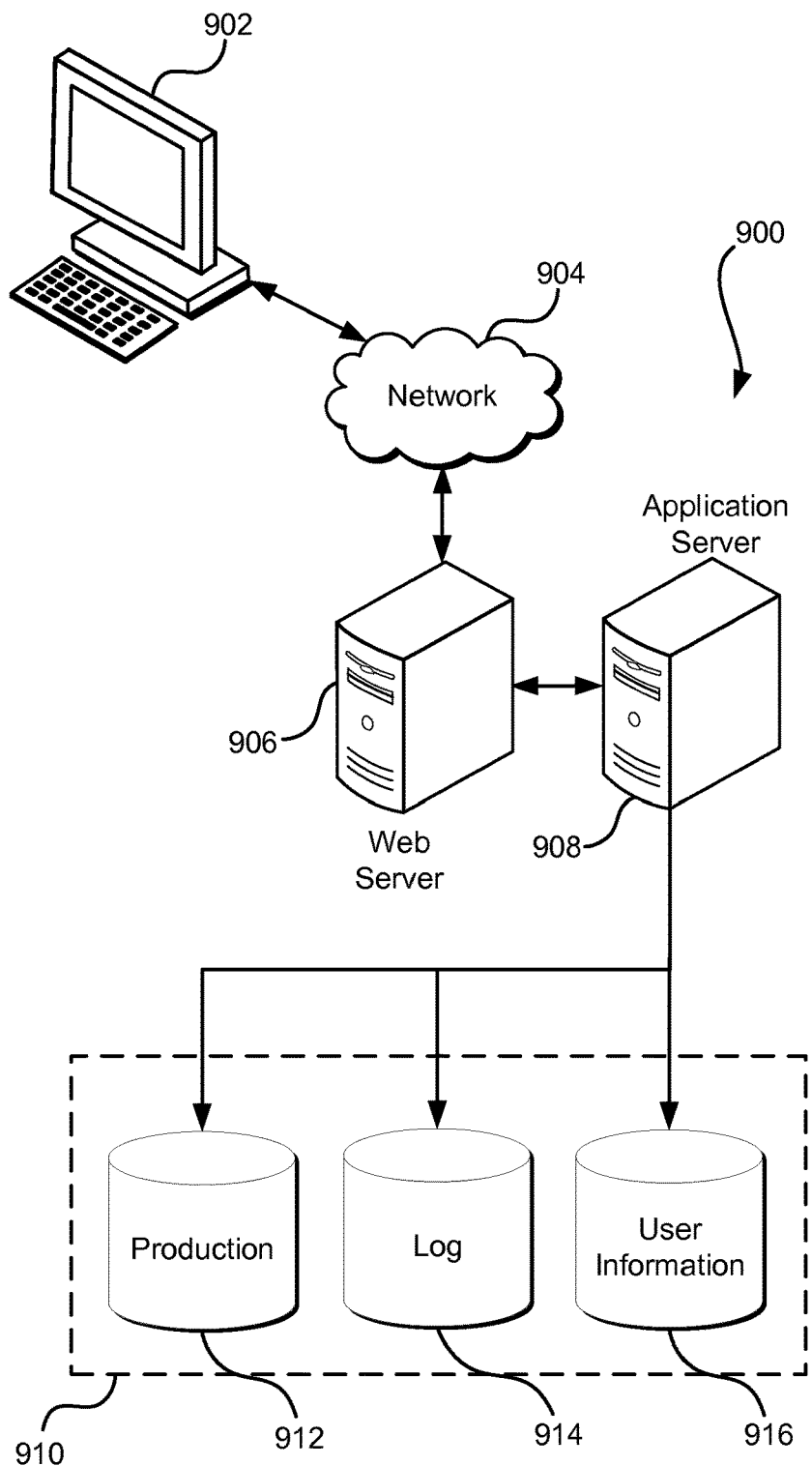
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, over a network and from a data access detection plugin running on a device with an application, a data access event notification corresponding to access by the application to a set of sensitive data;
    creating a data event object, the data event object including at least one or more metadata items associated with the data access event notification;
    writing, based at least in part on a determination by a policy service, a data log entry, the data log entry based at least in part on at least a subset of the data event object;
    determining, based at least in part on a similar characteristic between the data log entry and one or more other entries in a computer system log, that the data log entry is correlated with the one or more other entries;
    determining, based at least in part on the data log entry being correlated with the one or more other entries, a confidence value for a data access rule violation having occurred with the set of sensitive data;
    determining a data store location based at least in part on a metadata item included in the data event object;
    searching, in the data store location, for a set of data corresponding at least in part to a subset of the set of sensitive data; and
    as a result of locating the set of data corresponding at least in part to the subset of the set of sensitive data, performing, based at least in part on the confidence value and a sensitivity of the set of sensitive data, one or more operations to mitigate further access to the set of sensitive data.

2. The computer-implemented method of claim 1, wherein the one or more operations include at least one of:
    issuing an alarm, sending an email message,
causing a popup window message to be generated,
restricting access to the set of sensitive data,
revoking permissions associated with the application,
updating a data-access log, or
terminating a service associated with the set of sensitive data.

3. The computer-implemented method of claim 1, wherein the metadata item associated with data access event notification includes at least one of:
a date of a data access event associated with the data access event notification,
a time of the data access event,
a first uniform resource identifier of the application,
a second uniform resource identifier of a service associated with the set of sensitive data,
a third uniform resource identifier of a host machine of the application,
an identifier associated with the data access event, or
one or more data types associated with the set of sensitive data.

4. The computer-implemented method of claim 1, wherein the one or more other entries include at least one of:
a disk access event entry,
a clipboard access event entry,
attaching a universal serial bus device,
attaching a temporary storage device,
a network storage access event entry,
a file system write entry,
a network data reception entry, or
a network data transmission entry.

5. A system, comprising:
at least one computing device that implements one or more services, wherein the one or more services:
receive a data access event notification over a network and from a library module running on a device with an application, as a result of the application accessing a set of data;
record a log entry corresponding to the data access event notification in a data access log, the log entry based at least in part on a metadata item associated with the data access event notification;
determine, based at least in part on a similar characteristic between the log entry and one or more other entries of computer system events, that the log entry is correlated with the one or more other entries;
identify, based at least in part on the log entry being correlated with the one or more other entries, that a data access rule violation has occurred in accordance with a confidence value and a factor relating to a sensitivity of the set of data; and
consequent to having identified the data access rule violation, perform one or more operations to mitigate further access to the set of data based at least in part on a result of a search of a data store location for data matching at least part of the set of data, the data store location depending at least in part on the metadata item associated with the data access event notification, the one or more operations depending at least in part on the data access rule violation.

6. The system of claim 5, wherein the library module is an application plugin.

7. The system of claim 5, wherein the set of data includes at least a set of data specified as sensitive.

8. The system of claim 5, wherein the one or more operations to mitigate further access to the set of data include one or more operations to send an alert to an investigation response team, the alert based at least in part on the data access rule violation.

9. The system of claim 5, wherein the metadata item associated with the data access event notification includes a time of a data access event corresponding to the data access event notification.

10. The system of claim 5, wherein the one or more computer system events include events corresponding to file system access by the application.

11. The system of claim 5, wherein the data access rule violation is based at least in part on a correlation between a metadata item associated with the log entry and the one or more other entries, the correlation includes one of: a time correlation, a correlation based at least in part on a target entity, or a content correlation.

12. The system of claim 5, wherein the metadata item includes one or more metadata characteristics.

13. The system of claim 12, wherein the one or more metadata characteristics comprise one or more of entropy characteristics.

14. The system of claim 5, wherein the data access rule violation is based at least in part on a correlation between a metadata item associated with the log entry and the one or more other entries, the correlation includes one of: a data size correlation, a permission correlation, an entropy correlation, a data hash correlation, or a compression correlation.

15. A non-transitory computer-readable storage medium having collectively stored thereon executable instructions that, if executed by one or more processors of a computer system, cause the computer system to:
record a data access event log entry, generated by a client, corresponding to a data access event notification, the data access event notification received over a network and from a library module running on a device with an application corresponding to one or more data accesses, by the application, to at least a subset of a set of data, the data access event log entry including at least a metadata item associated with the data access event notification;
determine, based at least in part on a similar characteristic between the data access event log entry and one or more other entries in a computer system log of one or more computer system events, that the data access event log entry is correlated with the one or more other entries;
determine, based at least in part on the data access event log entry being correlated with the one or more other entries, that one or more data access rule violations have occurred in accordance with a confidence value; and
perform, based at least in part on the confidence value and an indication of sensitivity of at least a first subset of the set of data, one or more operations to mitigate further access to at least the first subset of the set of data, the first subset of the set of data based at least in part on a second subset of the set of data, the one or more operations based at least in part on a search in one or more data store locations for data matching at least part of the set of data, the one or more data store locations based at least in part on the metadata item associated with one or more data access events, the one or more operations depending at least in part on an evaluation of one or more data access rules, the one or more data access rules provided by a policy system.

16. The non-transitory computer-readable storage medium of claim 15, wherein the data access event notification are received from the library module associated with the application.

17. The non-transitory computer-readable storage medium of claim 15, wherein the set of data includes at least a set of data specified as sensitive.

18. The non-transitory computer-readable storage medium of claim 15, wherein the one or more operations to mitigate further access to the set of data include one or more operations to revoke one or more permissions associated with access to at least the subset of the set of data.

19. The non-transitory computer-readable storage medium of claim 15, wherein the metadata item associated with the data access event notification is one of:
   a first uniform resource identifier of the application,
   a second uniform resource identifier of a service associated with the set of data, or
   a third uniform resource identifier of a host machine of the application.

20. The non-transitory computer-readable storage medium of claim 15, wherein the one or more computer system events include events corresponding to network access by the application.

21. The non-transitory computer-readable storage medium of claim 15, wherein the data access event log entry being correlated with the one or more other entries include events corresponding to temporary storage access by the application.

* * * * *